United States Patent
Richert

(10) Patent No.: US 11,084,444 B2
(45) Date of Patent: Aug. 10, 2021

(54) METHOD FOR OPERATING AN OCCUPANT PROTECTION MEANS OF AN OCCUPANT PROTECTION DEVICE, AND OCCUPANT PROTECTION DEVICE

(71) Applicant: DAIMLER AG, Stuttgart (DE)

(72) Inventor: Julien Richert, Sindelfingen (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/639,451

(22) PCT Filed: Jun. 18, 2018

(86) PCT No.: PCT/EP2018/066058
§ 371 (c)(1),
(2) Date: Feb. 14, 2020

(87) PCT Pub. No.: WO2019/034302
PCT Pub. Date: Feb. 21, 2019

(65) Prior Publication Data
US 2021/0024024 A1    Jan. 28, 2021

(30) Foreign Application Priority Data
Aug. 16, 2017  (DE) .................. 10 2017 007 771.1

(51) Int. Cl.
*B60R 21/015* (2006.01)
*B60R 21/20* (2011.01)
(Continued)

(52) U.S. Cl.
CPC ........ *B60R 21/01554* (2014.10); *B60R 21/20* (2013.01); *B60R 2021/0004* (2013.01); *B60R 2021/2173* (2013.01)

(58) Field of Classification Search
CPC ............ B60R 21/01554; B60R 21/203; B60R 2021/0004; B60R 2021/0233; B62D 1/183
See application file for complete search history.

(56) References Cited

U.S. PATENT DOCUMENTS

| 5,507,521 A * | 4/1996 | Steffens, Jr. .......... B60R 21/203 180/282 |
| 7,874,576 B2 * | 1/2011 | Gandhi ................. B60R 21/203 280/728.2 |

(Continued)

FOREIGN PATENT DOCUMENTS

| DE | 19542201 C1 | 11/1996 |
| DE | 10309073 A1 | 9/2004 |

(Continued)

OTHER PUBLICATIONS

International Search Report dated Aug. 17, 2018 in related/corresponding International Application No. PCT/EP2018/066058.

(Continued)

*Primary Examiner* — James A English
(74) *Attorney, Agent, or Firm* — Patent Portfolio Builders PLLC

(57) ABSTRACT

A method for operating an airbag of an occupant protection device of a vehicle moveable in autonomous driving mode involves positioning the airbag in an active position depending on at least one trigger condition. The airbag is automatically positioned and/or aligned within a vehicle interior depending on a positioning of a vehicle seat assigned to the airbag.

7 Claims, 4 Drawing Sheets

Figure 1:
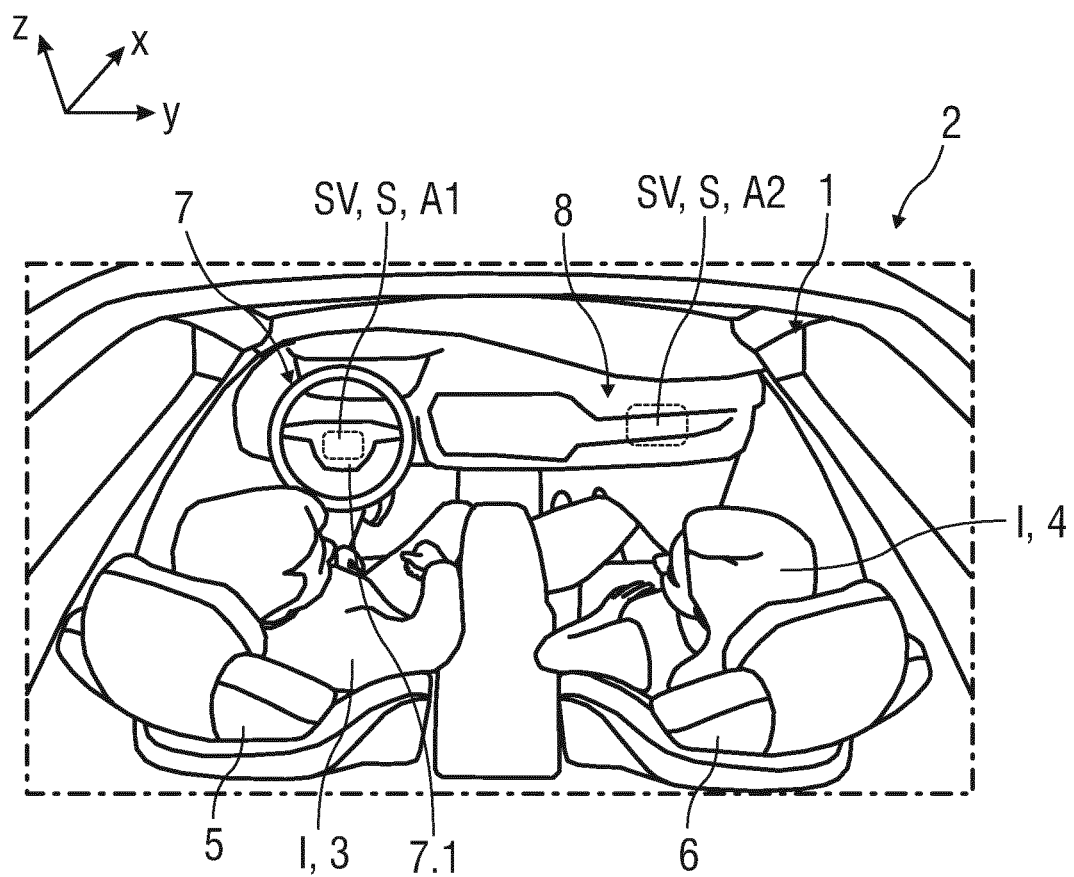

(51) Int. Cl.
*B60R 21/00* (2006.01)
*B60R 21/217* (2011.01)

(56) References Cited

U.S. PATENT DOCUMENTS

| | | | | |
|---|---|---|---|---|
| 8,910,971 | B1* | 12/2014 | Faruque | B60R 21/01 |
| | | | | 280/728.2 |
| 9,744,932 | B1* | 8/2017 | Faruque | B60R 21/16 |
| 9,821,746 | B1* | 11/2017 | O'Connor | B60R 21/205 |
| 10,081,323 | B2 | 9/2018 | Nagasawa et al. | |
| 10,160,417 | B2* | 12/2018 | Malapati | B60R 21/264 |
| 10,821,930 | B2* | 11/2020 | Malapati | B60R 21/0136 |
| 2007/0046003 | A1* | 3/2007 | Mori | B60R 21/203 |
| | | | | 280/731 |
| 2010/0140904 | A1* | 6/2010 | Choi | B60R 21/215 |
| | | | | 280/728.3 |
| 2016/0375927 | A1* | 12/2016 | Schulz | B62D 1/192 |
| | | | | 280/775 |
| 2017/0008475 | A1* | 1/2017 | Kruse | B60R 21/013 |
| 2017/0334383 | A1* | 11/2017 | Paxton | B60R 21/0136 |
| 2018/0029501 | A1 | 2/2018 | Wolf | |
| 2018/0118151 | A1* | 5/2018 | Weerappuli | B60R 21/264 |
| 2018/0126941 | A1* | 5/2018 | Faruque | B60R 21/261 |

FOREIGN PATENT DOCUMENTS

| | | |
|---|---|---|
| DE | 10353446 B4 | 9/2005 |
| DE | 102014002187 A1 | 8/2015 |
| DE | 102015111796 A1 | 2/2016 |
| DE | 102015008883 A1 | 3/2016 |
| DE | 102015010257 A1 | 3/2016 |
| DE | 102015013188 A1 | 4/2016 |
| DE | 102015014138 A1 | 4/2016 |
| DE | 102015206501 A1 | 10/2016 |
| DE | 102016118216 A1 | 4/2017 |
| DE | 102017100239 A1 | 7/2017 |
| GB | 2547778 A | 8/2017 |

OTHER PUBLICATIONS

Office Action dated Jan. 3, 2018 in related/corresponding DE Application No. 10 2017 007 771.1.

Written Opinion dated Aug. 17, 2018 in related/corresponding International Application No. PCT/EP2018/066058.

* cited by examiner

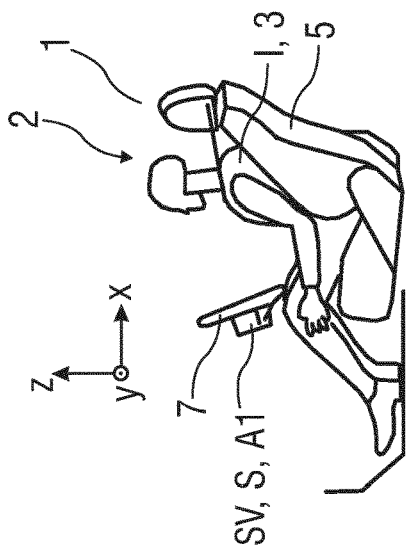
FIG 2
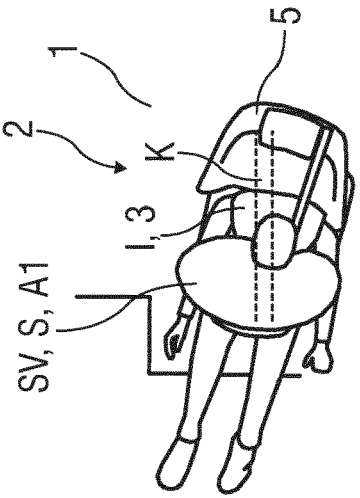
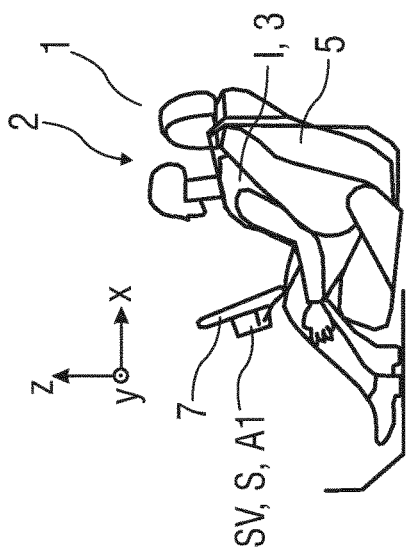
FIG 3
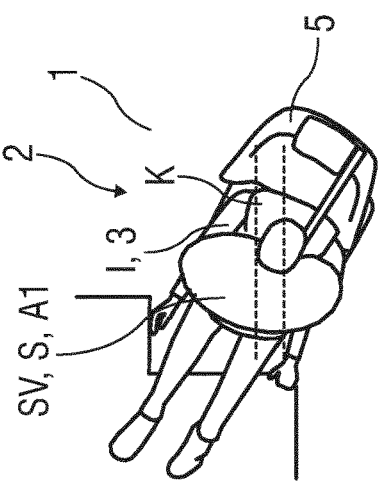
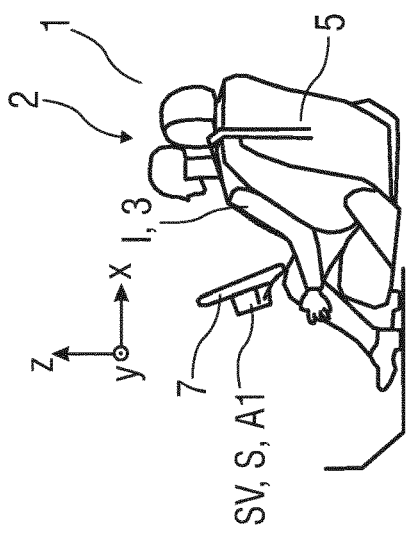
FIG 4
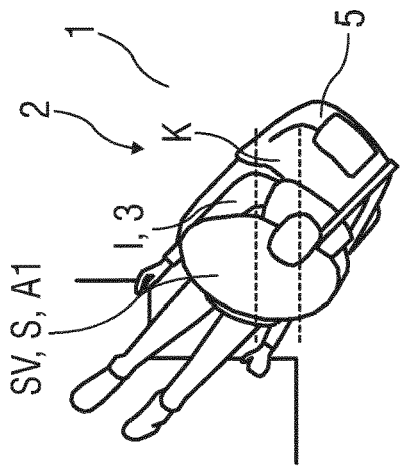

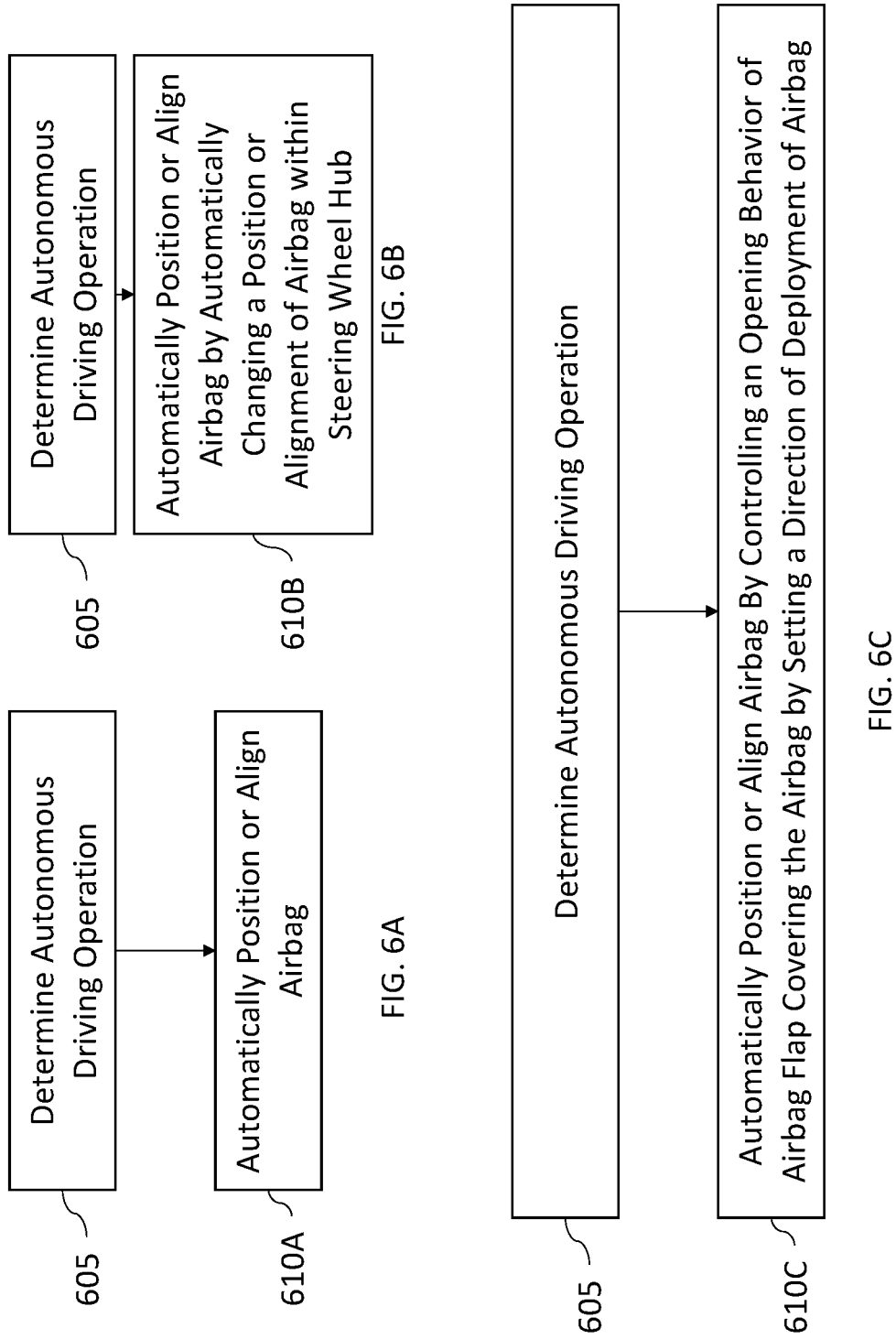

METHOD FOR OPERATING AN OCCUPANT PROTECTION MEANS OF AN OCCUPANT PROTECTION DEVICE, AND OCCUPANT PROTECTION DEVICE

BACKGROUND AND SUMMARY OF THE INVENTION

Exemplary embodiments of the invention relate to a method for operating at least one occupant protection means of an occupant protection device of a vehicle moveable in autonomous driving mode, wherein the occupant protection means is positioned in an active position depending on at least one trigger condition. Furthermore, the invention relates to an occupant protection device having at least one occupant protection means for a vehicle.

It is generally known that a vehicle comprises an occupant protection device having a plurality of occupant protection means which, in the event of a detected collision imminent to the vehicle and/or a detected collision of the vehicle, are positioned in an active position in order to at least reduce the severity of injury to an occupant. By way of example, an airbag, a so-called driver's airbag, is assigned to a driver of the vehicle, said airbag being arranged in a steering wheel hub of a steering wheel of the vehicle and deploying between the steering wheel and the driver when a trigger condition occurs.

Furthermore, DE 10 2015 206 501 A1 discloses a vehicle and a method for operating a vehicle. The vehicle comprises a cockpit, a driver's seat and at least one driver-relevant cockpit element for functional use by a driver of the vehicle, which can be operated in a manual driving mode and in an at least partially automatic driving mode. The method provides that a first position of the driver's seat and a first position of the at least one driver-relevant cockpit element are set when the vehicle is operated in the manual driving mode. A second position of the driver's seat and/or a second position of the at least one driver-relevant cockpit element are or is set when the vehicle is operated or is to be operated in the automatic driving mode, wherein the second position of the driver's seat and/or of the driver-relevant cockpit element are or is set in such a way that the at least one cockpit element can be used functionally by the driver.

In addition, DE 102015008883 A1 discloses an occupant protection device for a vehicle having an occupant protection means that can be controlled and positioned in its active position in the event of a detected collision imminent to the vehicle or in the event of a detected collision of the vehicle. Here, the occupant protection means is designed as a blanket and/or a footmuff for covering at least sections of an occupant positioned on a vehicle seat, wherein the occupant protection means solidifies to assume its active position in such a way that the occupant is fixed to the vehicle seat in the active position of the occupant protection means.

DE 102015013188 A1 also discloses an occupant protection device for a vehicle having at least one occupant protection means that can be positioned in its active position in the event of a detected collision imminent to the vehicle or in the event of a detected collision. In this case, the occupant protection means is designed as an airbag which, in its active position, extends in the longitudinal direction of the vehicle, the airbag having a section which deploys between front vehicle seats and two further sections which deploy substantially obliquely downwards in the backseat area.

Exemplary embodiments of the invention are directed to a method, which is improved in comparison to prior art, for operating an occupant protection means of an occupant protection device of a vehicle and an occupant protection device for a vehicle.

A method for operating at least one occupant protection means of an occupant protection device of a vehicle moveable in autonomous driving mode provides that the occupant protection means is positioned in an active position depending on at least one trigger condition. According to the invention, the occupant protection means is implemented as an airbag that is automatically positioned and/or aligned within a vehicle interior depending on a positioning of a vehicle seat assigned to the airbag.

In particular in the autonomous driving mode, in which a driver of the vehicle surrenders his driving task in full to the vehicle, the driver has the possibility of positioning his/her vehicle seat within the vehicle interior in such a way that the line of vision of the driver deviates substantially in relation to the longitudinal axis of the vehicle and the driver is not aware of what is happening in front of the vehicle. The driver of the vehicle can thus turn his gaze away from the driving action during autonomous driving operation and pursue other activities, such as reading.

If the vehicle seat is rotated, in the event of a collision of the vehicle, in particular a frontal collision, the driver on the vehicle seat is not, according to the prior art, in an optimum position relative to the airbag, such that a protective effect of the airbag for the driver cannot be ensured.

By using the method, a direction of airbag deployment depending on the positioning of the vehicle seat is predetermined, such that the direction of airbag deployment is optimized in relation to the position of the driver and the protective effect of the airbag for the driver is thus improved. In other words, a safety level for the driver is increased in the autonomous driving mode of the vehicle.

Furthermore, it is possible that the method can also be applied to an airbag associated with another vehicle seat having a position and/or alignment within the vehicle interior which can be changed.

In one embodiment, the airbag is displaced in the direction of a transverse axis of the vehicle for positioning and/or alignment with respect to an occupant on the vehicle seat and/or the airbag is rotated at least about a vertical axis of the vehicle to change its direction of deployment. Since the airbag can be shifted and/or rotated, the direction of deployment of the airbag can be predetermined in such a way that the airbag in its active position can substantially ensure its protective effect for the occupant, in particular, the driver.

The airbag can be positioned and/or aligned by shifting and/or rotating it in such a way that, in the event of a collision of the vehicle, the occupant hits the airbag centrally and thus optimally with his head, and thus the risk of injury to the occupant can be significantly reduced.

In a further embodiment, the airbag is positioned and/or aligned at the latest at the moment of detection of a collision imminent to the vehicle, depending on the positioning of the vehicle seat within the vehicle interior. This ensures that sufficient time is available to position and/or align the airbag in relation to the positioning of the vehicle seat such that the airbag can deploy in the direction of the occupant and a risk of injury to the occupant, in particular the driver of the vehicle, can be reduced.

A development of the invention provides that a position and/or alignment of the airbag within a steering wheel hub of a steering wheel of the vehicle is automatically changed depending on the positioning of the vehicle seat.

By changing the position and/or alignment of the airbag, its direction of deployment is predetermined, wherein this is changed in relation to the positioning of the vehicle seat within the vehicle interior in order to achieve the maximum protective effect for the occupant on the vehicle seat in the autonomous driving mode of the vehicle.

An alternative or additional embodiment provides that, in the case of an airbag arranged in a steering wheel hub, a steering wheel of the vehicle is automatically positioned depending on the positioning of the vehicle seat. For this purpose, the steering wheel is shiftably mounted, in particular in the direction of the transverse axis of the vehicle, such that the airbag is positioned and/or aligned depending on the positioning of the vehicle seat and thus the protective effect of the airbag for the occupant can be optimized.

Alternatively, or additionally, it can again be provided that the airbag has a controllable moveable element, by means of which a direction of deployment of the airbag is predetermined depending on a positioning of the vehicle seat. Here, the moveable element represents a positioning element that is activated, if necessary, to predetermine the direction of deployment of the airbag with regard to the occupant on the vehicle seat.

In a further alternative or additional embodiment, an opening behavior of an airbag flap covering the airbag is controlled to specify a direction of airbag deployment dependent on the positioning of the vehicle seat. Here, the opening behavior is controlled in such a way that the airbag is deployed in the direction of the occupant on the vehicle seat and the protective effect of the airbag for the occupant can thus be optimized.

In addition, the invention relates to an occupant protection device having at least one occupant protection means for a vehicle moveable in autonomous driving mode, wherein the occupant protection means can be positioned in an active position depending on at least one trigger condition. In this way, the occupant protection means is implemented according to the invention as an airbag that can be automatically positioned and/or aligned within a vehicle interior depending on a positioning of a vehicle seat assigned to the airbag.

By means of an occupant protection device designed in this way, protection against injury for an occupant on the vehicle seat, in particular a driver of the vehicle, is improved, since a direction of deployment of the airbag can be predetermined, such that the airbag in its active position is positioned and/or aligned at least optimally in relation to the position of the occupant.

BRIEF DESCRIPTION OF THE DRAWING FIGURES

Exemplary embodiments of the invention are explained in more detail below using drawings.

Figure 5:
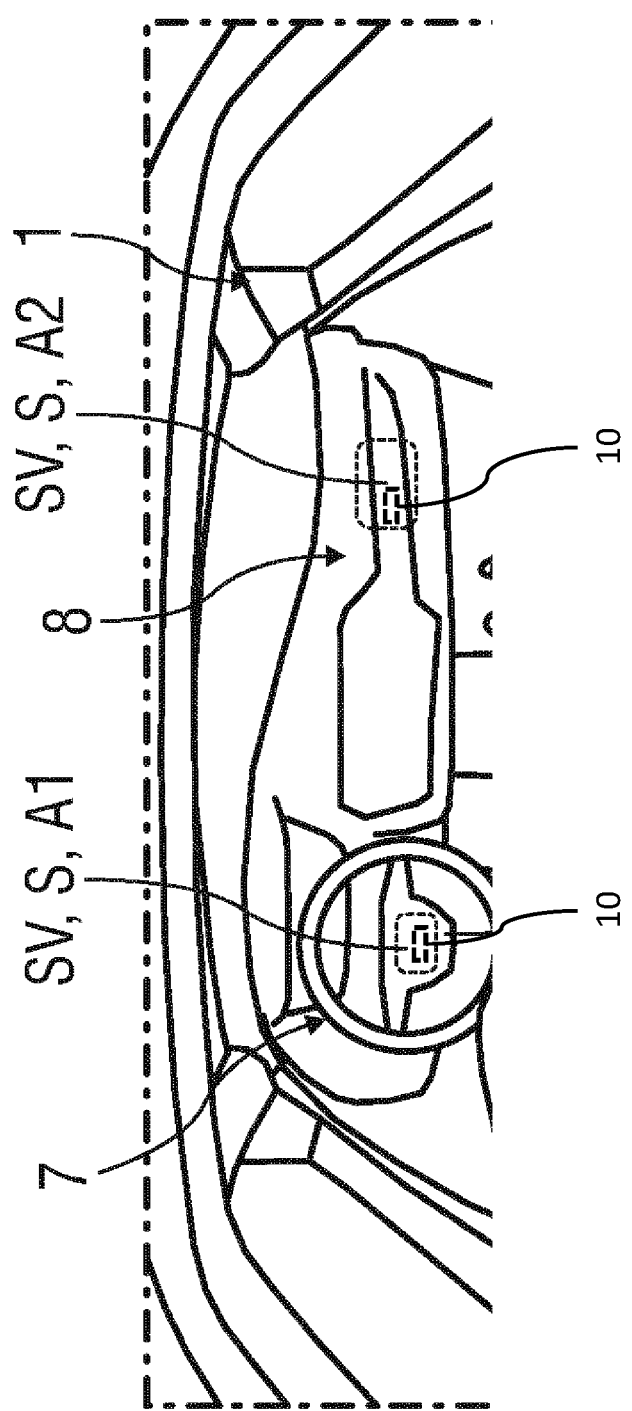

Here are shown:

FIG. 1 schematically a perspective view of a vehicle interior having a driver and a passenger, FIG. 2 schematically an occupant on a vehicle seat, which is rotated about 15° in relation to the longitudinal axis of the vehicle, in a side view and a top view, FIG. 3 schematically the occupant on the vehicle seat, which is rotated about 30° in relation to the longitudinal axis of the vehicle, in a side view and a top view, FIG. 4 schematically the occupant on the vehicle seat, which is rotated about 45° in relation to the longitudinal axis of the vehicle, in a side view and a top view, FIG. 5 schematically a perspective view of a vehicle interior having a moveable element, FIGS. 6A-6C flowcharts of methods for operating an airbag of an occupant protection device of a vehicle.

Parts corresponding to one another are provided with the same reference numerals in all figures.

DETAILED DESCRIPTION

FIG. 1 shows a perspective view of a vehicle interior 1 of a vehicle 2 having two occupants I, a driver 3 and a passenger 4.

The vehicle 2 has an assistance system (not explained in more detail here), by means of which the vehicle 2 can be moved in an autonomous driving mode. In the autonomous driving mode of the vehicle 2, the driver 3 surrenders his/her driving task completely to the vehicle 2, such that the driver 3 can devote himself/herself to other activities during the autonomous driving mode.

In such an autonomously moveable vehicle 2, a vehicle seat 5 of the driver 3 and a vehicle seat 6 of the passenger 4 are mounted so as to be rotatable in relation to the vehicle vertical axis z. This makes it possible for the two vehicle seats 5, 6 to be able to be positioned in the vehicle interior 1 in such a way that the driver 3 and the front passenger 4 sit facing each other.

By rotating the vehicle seats 5, 6 about the vehicle vertical axis z, the occupants I on the vehicle seats 5, 6 are not optimally positioned in relation to a respective airbag A1, A2 depicted with a dotted line, as occupant protection means S of an occupant protection device SV of the vehicle 2.

In particular, an airbag A1, a so-called driver's airbag, is assigned to the vehicle seat 5 of the driver 3, wherein the airbag A1 is usually located in a steering wheel hub 7.1 of a steering wheel 7 of the vehicle 2.

If the vehicle seat 5 is rotated relative to its usual driving position, there is a risk that, in the event of a collision of the vehicle 2, in particular a frontal collision, the driver 3 will not hit the airbag A1 centrally with his head, such that a protective effect of the airbag A1 cannot be ensured.

The same applies to a further airbag A2 assigned to the passenger 4 and arranged in a cladding part 8 located in front of the passenger 4 in the direction of travel x when the vehicle seat 6 is rotated in relation to the longitudinal axis x of the vehicle corresponding to the direction of travel x.

In accordance with the prior art, the airbags 5, 6 are integrated into the steering wheel 7 and the cladding part 8 in a fixed position, in particular with respect to the transverse axis y of the vehicle.

In the case of a seat rotation of the vehicle seats 5, 6, they are not optimally aligned with the airbags A1, A2, such that a restraining of the driver 3 or the passenger 4 by means of the correspondingly activated airbags A1, A2, which are positioned in their active position, is not ensured.

If the vehicle seat 5 of the driver 3 is turned by 15° in relation to the longitudinal axis x of the vehicle, as is shown in FIG. 2, a deviation of the head position of the driver 3 in relation to the airbag A1 is comparatively small, wherein the driver 3 does not hit his/her head optimally.

An optimal head position K of the occupant I in relation to the airbag A1 in its active position is shown in FIGS. 2 to 4 by means of dotted lines.

In FIGS. 2 to 4, a side view and a top view of a driver 3 on his vehicle seat 5 are respectively shown, wherein the latter is rotated by 30° in FIG. 3 and by 45° in FIG. 4 in relation to the longitudinal axis x of the vehicle.

The greater the angle of rotation of the vehicle seat 5 to the longitudinal axis x of the vehicle, the greater the lateral shifting of a head center of gravity relative to the airbag A1 in the event of a collision of the vehicle 2. This displacement of the head center of gravity relative to the airbag A1 can result in the head of the occupant I, in the present exemplary embodiments of the driver 3, slipping off the airbag A1, whereby the load on the head and neck of the driver is increased.

In order to increase the safety level for the driver 3 of the vehicle 2 in the event of a collision, in particular a frontal collision, when the vehicle seat 5 is rotated in relation to the longitudinal axis x of the vehicle, it is provided to position and/or align the airbag A1 within the vehicle interior 1 depending on the positioning of the vehicle seat 5.

In a possible embodiment, the airbag A1 is shifted in the direction of the transverse axis y of the vehicle when the seat is rotated correspondingly.

Here, the shifting of the airbag A1 can occur when the vehicle seat 5 is rotated or when it is determined that the vehicle 2 is about to have a collision, based on signals detected by a collision sensor system of the vehicle 2. The airbag A1 is thus shifted when a dangerous situation for the vehicle 2 is determined based on the signals.

A length of a shifting path of the airbag A1 can, for example, be determined based on the optimum head position K, wherein the head center of gravity of the occupant I in the optimum head position K and a center of the airbag A1, in particular with regard to its width, are in line.

Alternatively, or additionally, the length of the shifting path can be determined based on a calculated flight curve of the head, for example, by considering a phase before the accident and/or a direction of impact of the collision.

In order to adapt a direction of deployment of the airbag A1 depending on the rotation of the vehicle seat 5 on which the driver 3 sits, it is provided in an embodiment that the position of the airbag A1 within the steering wheel hub 7.1 is changed accordingly.

Alternatively, or additionally, it can be provided that the steering wheel 7 with the airbag A1 is shifted in the direction of the transverse axis y of the vehicle by the determined shifting distance.

For this purpose, the steering wheel 7 is shiftably mounted, for example, by means of a guide rail arranged parallel to the transverse axis y of the vehicle.

In an alternative or additional design of the occupant protection device SV, a position of the airbag A1 in relation to the vertical axis z of the vehicle can be changed in order to change the direction of deployment of the airbag A1. By way of example, an angle between the airbag A1 and the vertical axis z of the vehicle and/or an angle between the airbag A1 and a vertical axis of the steering wheel 7 is changed such that, in the case of a changed seating position, the airbag A1 deploys in the direction of the occupant I, i.e. the driver 5.

Again, alternatively or additionally, the airbag A1, in particular an airbag module of which the airbag A1 is a component, can have a moveable element 10 (FIG. 5), in particular a so-called positioning element.

This moveable element 10 can be controlled, such that a position of the moveable element 10 can be changed depending on the seat rotation in order to determine the direction of deployment of the airbag A1.

It is also conceivable that the opening behavior of an airbag flap covering the airbag A1 (not shown in more detail here) is controlled as an alternative or in addition to the above-mentioned designs, such that the direction of deployment of the airbag A1 is changed and thereby set.

The airbag flap can thus only be partially opened, for example, in order to predetermine the direction of deployment of the airbag A1 depending on the rotation of the vehicle seat 5 of the driver 3.

Furthermore, it can be provided that the additional airbag A2 assigned to the passenger 4 is also positioned depending on the rotation of the vehicle seat 6 of the passenger 4 in order to change the direction of deployment of the additional airbag A2 and thus increase the level of protection for the passenger 4, in particular in the autonomous driving mode of the vehicle 2.

Referring now to FIG. 6A, the method involves determining that the vehicle is being operated in an autonomous driving operation (step 605). The method also involves automatically positioning or aligning the airbag, responsive to the determination that the vehicle is being operated in the autonomous driving operation, within an interior of the vehicle depending on an angle of a vehicle seat assigned to the airbag relative to a longitudinal axis of the vehicle (step 610A). The automatic positioning or alignment can be achieved by shifting the airbag in a direction of a transverse axis of the vehicle, or rotating the airbag at least about a vertical axis of the vehicle to change a direction of deployment of the airbag. As illustrated in FIG. 6B, the automatic positioning or alignment of the airbag can comprise automatically changing a position or alignment of the airbag within a steering wheel hub of a steering wheel of the vehicle depending on the positioning of the vehicle seat (step 610B). As illustrated in FIG. 6C, the positioning or aligning of the airbag comprises controlling an opening behavior of an airbag flap covering the airbag by setting a direction of deployment of the airbag depending on the positioning of the vehicle seat (step 610C).

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating an airbag of an occupant protection device of a vehicle, the method comprising:
   determining that the vehicle is being operated in an autonomous driving operation;
   automatically positioning or aligning the airbag, responsive to the determination that the vehicle is being operated in the autonomous driving operation, within an interior of the vehicle depending on an angle of a vehicle seat assigned to the airbag relative to a longitudinal axis of the vehicle by
   shifting the airbag in a direction of a transverse axis of the vehicle, or
   rotating the airbag at least about a vertical axis of the vehicle to change a direction of deployment of the airbag,
   wherein the automatic positioning or alignment of the airbag comprises automatically changing a position or alignment of the airbag within a steering wheel hub of a steering wheel of the vehicle depending on the positioning of the vehicle seat.

2. The method of claim 1, wherein the airbag has a controllable moveable element via which a direction of deployment of the airbag is predetermined depending on a positioning of the vehicle seat.

3. The method of claim 1, wherein the positioning or aligning of the airbag comprises controlling an opening behavior of an airbag flap covering the airbag by setting a direction of deployment of the airbag depending on the positioning of the vehicle seat.

4. The method of claim 1, wherein the airbag is automatically positioned or aligned within the vehicle interior depending on the positioning of the vehicle seat prior to detecting an imminent collision to the vehicle.

5. A method for operating an airbag of an occupant protection device of a vehicle, the method comprising:
   determining that the vehicle is being operated in an autonomous driving operation;
   automatically positioning or aligning the airbag, responsive to the determination that the vehicle is being operated in the autonomous driving operation, within an interior of the vehicle depending on an angle of a vehicle seat assigned to the airbag relative to a longitudinal axis of the vehicle by
      shifting the airbag in a direction of a transverse axis of the vehicle, or
      rotating the airbag at least about a vertical axis of the vehicle to change a direction of deployment of the airbag,
   wherein the airbag is arranged in a steering wheel hub, and wherein the automatic positioning or alignment of the airbag comprises automatically positioning a steering wheel of the vehicle depending on the positioning of the vehicle seat.

6. An occupant protection device for a vehicle, the occupant protection device comprising:
   an airbag that is automatically positioned or aligned within an interior of the vehicle depending on an angle of a vehicle seat assigned to the airbag relative to a longitudinal axis of the vehicle when the vehicle is operated in an autonomous driving operation by
      shifting the airbag in a direction of a transverse axis of the vehicle, or
      rotating the airbag at least about a vertical axis of the vehicle to change a direction of deployment of the airbag,
   wherein the airbag is arranged in a steering wheel hub, and wherein the automatic positioning or alignment of the airbag comprises automatically positioning a steering wheel of the vehicle depending on the positioning of the vehicle seat.

7. The occupant protection device of claim 6, wherein the airbag has a controllable moveable element via which a direction of deployment of the airbag is predetermined depending on a positioning of the vehicle seat.

* * * * *